UNITED STATES PATENT OFFICE.

LEONARD ROBERTS COATES, OF BALTIMORE, MARYLAND, ASSIGNOR TO THE AMERICAN BACTERIA-IZED FERTILIZER COMPANY, A CORPORATION OF MARYLAND.

FERTILIZER.

No. 900,056.  Specification of Letters Patent.  Patented Sept. 29, 1908.

Application filed October 17, 1907. Serial No. 397,762.

*To all whom it may concern:*

Be it known that I, LEONARD ROBERTS COATES, of the city of Baltimore and State of Maryland, have invented certain Improvements in Fertilizers, of which the following is a specification.

This invention relates to the preservation of micro-organisms or bacteria such as are used for the rapid fixing or gathering of atmospheric nitrogen in the nourishment of plant life, and which are found in colonies in the nodules of plants of the order of *Leguminosæ*, such as clover, peas, etc.

This invention consists in treating the roots of plants of the different species of *Leguminosæ* with their adhering bacteria-bearing nodules, in such manner as to produce a dry powder consisting of a mixture of a vegetable matter and the said bacteria.

The preferred process of obtaining the above result consists in drying the said roots with their adhering bacteria-bearing nodules and grinding them to a powder. These if not for immediate use are generally placed in suitable air-tight receptacles to protect them against moisture in the air. It is however, within the scope of the present invention to grind the plants when green, and then dry the ground material, for the reason that the result is the same, viz., the production of a dry concentrated material rich in bacteria adapted for incorporation with fertilizers, or for use in any manner whereby the bacteria is brought into contact with plant life.

It is well known that bacteria when combined with an inert material such for instance as cotton, may be retained in inactive condition for a limited time; and heretofore aqueous and other solutions containing the bacteria have been used as a means for impregnating the inert material. But in all the processes with which I am acquainted, the bacteria are separated from their natural envelop, and then treated. In my present invention the bacteria are never separated from the life sustaining material in which they are found in nature, and their preservation in an inactive state from which they may become active, is prolonged indefinitely; and further, the material may be applied to plant life strictly in accordance with natural processes, differing in no wise from the turning-in of clover or pea plants in ordinary farming, except that owing to the substance being a concentrated bacteria-carrying vehicle, it may be sparingly applied to other substances in which the bacteria rapidly multiply, to increase its bulk, and thereby admit of a more economical distribution of the bacteria to the soil. For instance, should the entire crop of an acre of clover be returned to the earth by plowing, the bacteria used would be in excess of what is required, in view of their natural increase, but should one-hundredth only of the nodules of the said crop of clover be returned, the natural increase of bacteria would be availed of, and ninety-nine per cent. of the same could be employed on other land.

I claim as my invention:—

An improved bacteria - carrying vehicle adapted for mixture with other materials, which consists of dry ground roots of plants of the species of *Leguminosæ* with their bacteria-bearing nodules.

LEONARD ROBERTS COATES.

Witnesses:
WM. T. HOWARD,
THOMAS G. HULL.